US012678008B2

(12) United States Patent
Leong et al.

(10) Patent No.: US 12,678,008 B2
(45) Date of Patent: *Jul. 14, 2026

(54) MOBILE ROBOT PERFORMING CLIFF DETECTION

(71) Applicant: PixArt Imaging Inc., Hsin-Chu County (TW)

(72) Inventors: Keen-Hun Leong, Penang (MY); Sai-Mun Lee, Penang (MY); Ching-Geak Chan, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 80 days.

This patent is subject to a terminal disclaimer.

(21) Appl. No.: 18/907,619

(22) Filed: Oct. 7, 2024

(65) Prior Publication Data

US 2025/0025010 A1     Jan. 23, 2025

Related U.S. Application Data

(63) Continuation of application No. 17/353,818, filed on Jun. 22, 2021, now Pat. No. 12,137,855.

(60) Provisional application No. 63/090,734, filed on Oct. 13, 2020.

(51) Int. Cl.
| | |
|---|---|
| *G05D 1/00* | (2024.01) |
| *A47L 11/40* | (2006.01) |
| *G05D 1/249* | (2024.01) |
| *G05D 1/65* | (2024.01) |
| *G06T 5/50* | (2006.01) |

(52) U.S. Cl.
CPC ........ *A47L 11/4011* (2013.01); *G05D 1/0223* (2013.01); *G05D 1/0246* (2013.01); *G05D 1/249* (2024.01); *G05D 1/65* (2024.01); *G06T 5/50* (2013.01); *A47L 2201/04* (2013.01)

(58) Field of Classification Search
None
See application file for complete search history.

(56) References Cited

U.S. PATENT DOCUMENTS

| | | | |
|---|---|---|---|
| 2013/0182077 A1* | 7/2013 | Holz ........................ G06F 3/017 |
| | | | 348/46 |
| 2019/0274505 A1* | 9/2019 | Ng ............................ G05D 1/02 |
| 2021/0096560 A1* | 4/2021 | al-Mohssen ........ A47L 11/4061 |
| 2021/0264572 A1* | 8/2021 | Hrabe ........................ G06T 5/92 |
| 2022/0015596 A1* | 1/2022 | White ................... A47L 9/2857 |

* cited by examiner

*Primary Examiner* — Khoi H Tran
*Assistant Examiner* — Trang Dang
(74) *Attorney, Agent, or Firm* — WPAT, PC

(57) ABSTRACT

There is provided a mobile robot including a light source, an image sensor and a processor. The image sensor respectively captures bright image frames and dark image frames corresponding to the light source being turned on and turned off. The processor identifies that the mobile robot faces a cliff when a gray level variation between the bright image frames and the dark image frames is very small, and controls the mobile robot to stop moving forward continuously.

20 Claims, 2 Drawing Sheets

MOBILE ROBOT PERFORMING CLIFF DETECTION

CROSS REFERENCE TO RELATED APPLICATION

The present application is a continuation application of U.S. patent application Ser. No. 17/353,818 filed on Jun. 22, 2021, which claims the priority benefit of U.S. Provisional Application Ser. No. U.S. 63/090,734, filed on Oct. 13, 2020, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a mobile robot and, more particularly, to a mobile robot and a cliff detection method thereof that identify a cliff according to pixel statistics detected corresponding to turning on and turning off a light source.

2. Description of the Related Art

The cleaning robot has become one important product of various home appliances in the smart home. During operation, the cleaning robot needs to identify a cliff in front to prevent falling down that can cause damage of the product and reduce the lifetime thereof.

The current cliff detection is implemented by using a mechanical sensor or an ultrasonic sensor.

Accordingly, the present disclosure further provides an optical cliff detection method and a mobile robot using the same.

SUMMARY

The present disclosure provides a mobile robot and a cliff detection method thereof that identify whether a cliff is approached according to a difference of pixel statistics corresponding to a light source being turned on and turned off.

The present disclosure further provides a mobile robot and a cliff detection method thereof that start to perform the cliff detection when a decrement of calculated moving speed is larger than a variation threshold.

The present disclosure provides a mobile robot including a light source, an image sensor and a processor. The light source is configured to be turned on within a first interval and be turned off within a second interval. The image sensor is configured to capture multiple bright image frames within the first interval using a first shutter, and capture multiple dark image frames within the second interval using a second shutter, wherein, within the second interval, the light source is not turned on between capturing adjacent two dark image frames among the multiple dark image frames. The processor is configured to calculate an average of first gray level summation of the multiple bright image frames, calculate an average of second gray level summation of the multiple dark image frames, calculate a gray level difference between the average of first gray level summation and the average of second gray level summation, and perform cliff identification according to the gray level difference.

The present disclosure further provides a mobile robot including a light source, an image sensor and a processor. The light source is configured to be turned on within a first interval and be turned off within a second interval. The image sensor is configured to capture multiple bright image frames within the first interval using a first shutter, and capture multiple dark image frames within the second interval using a second shutter, wherein, within the second interval, the light source is not turned on between capturing adjacent two dark image frames among the multiple dark image frames. The processor is configured to calculate an average of first image quality of the multiple bright image frames, calculate an average of second image quality of the multiple dark image frames, calculate an image quality difference between the average of first image quality and the average of second image quality, and perform cliff identification according to the image quality difference.

The present disclosure further provides a mobile robot including a light source, an image sensor and a processor. The light source is configured to be turned on within a first interval and be turned off within a second interval. The image sensor is configured to capture multiple bright image frames within the first interval using a first shutter, and capture multiple dark image frames within the second interval using a second shutter, wherein, within the second interval, the light source is not turned on between capturing adjacent two dark image frames among the multiple dark image frames. The processor is configured to calculate an average of multiple first shutters within the first interval and an average of multiple second shutters within the second interval, calculate an average shutter difference between the average of multiple first shutters and the average of multiple second shutters, and perform cliff identification according to the average shutter difference.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The mobile robot of the present disclosure is adaptable to identify whether there is a cliff in front during operation to prevent falling down that can damage a main body of the mobile robot. Furthermore, a sensing chip of the present disclosure may be arranged on different types, which can affect ambient light intensity being received by the image sensor, of mobile robot, and pre-stored thresholds of the present disclosure are selectable according to said different types of mobile robot to improve the user experience.

Figure 1:
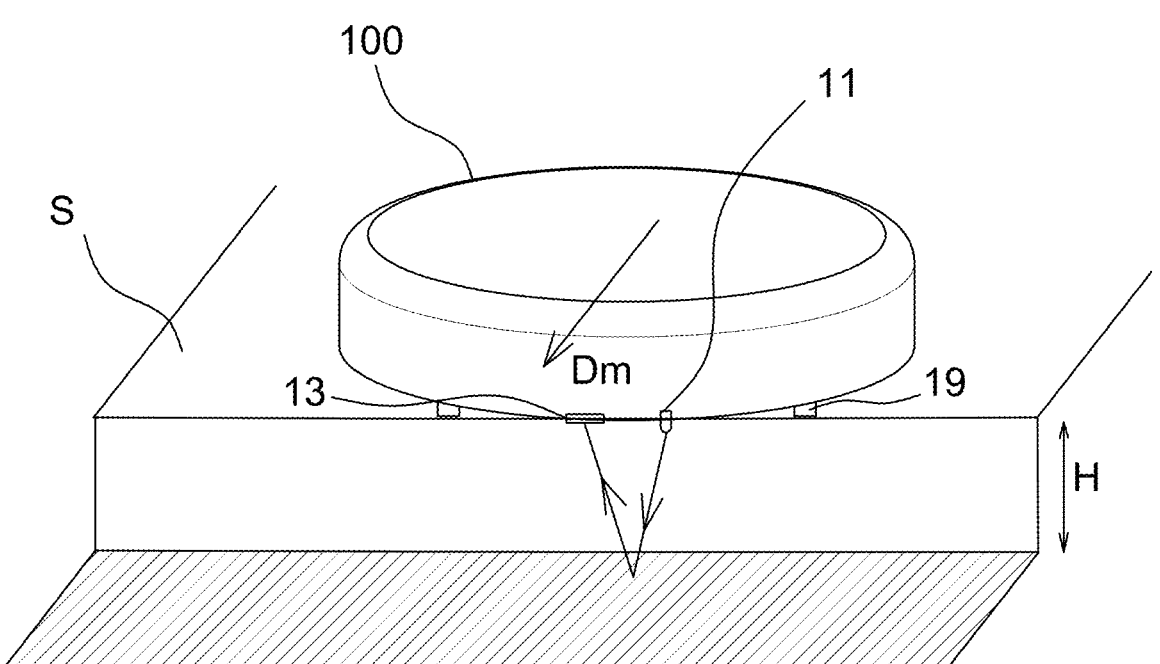
FIG. 1 is a schematic diagram of a mobile robot of the present disclosure approaching a cliff.
Figure 2:
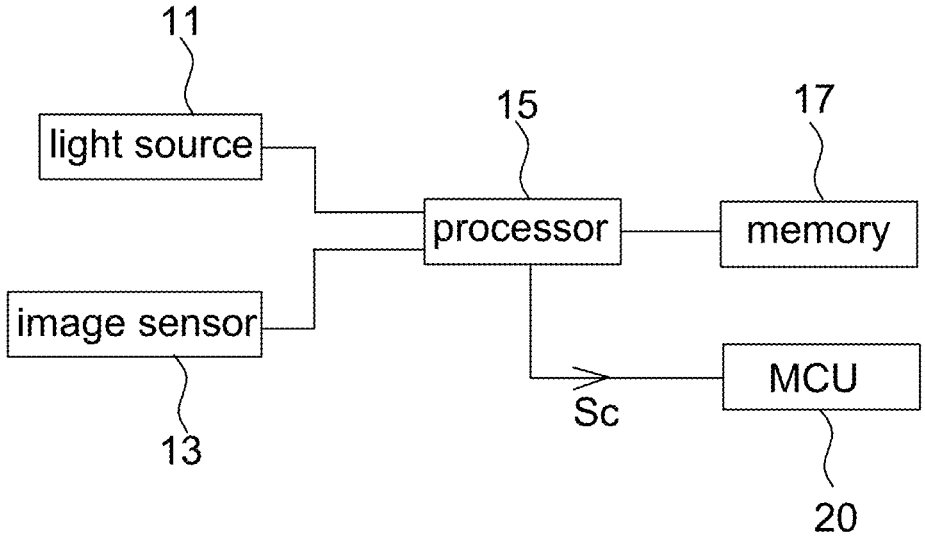
FIG. 2 is a schematic block diagram of a mobile robot according to one embodiment of the present disclosure.

Please refer to FIGS. 1 and 2, FIG. 1 is a schematic diagram of a mobile robot 100 of the present disclosure approaching a cliff (e.g., shown by a stair herein, but not limited to) in a moving direction Dm; and FIG. 2 is a schematic block diagram of a mobile robot 100 according to one embodiment of the present disclosure.

During operation, the mobile robot 100 moves at a preset speed on an operation surface S. The preset speed is a predetermined moving speed set before shipment of the mobile robot 100. In one aspect, the preset speed is different corresponding to different operation surfaces, e.g., different preset speeds are arranged corresponding to a soft surface (e.g., carpet, but not limited to) and a hard surface (e.g., tiles, but not limited to).

The mobile robot 100 includes a light source 11, an image sensor 13, a processor 15, a memory 17 and a micro controller unit (MCU) 20. The processor 15 is used to control the operation of the light source 11 and the image sensor 13 and access data (e.g., pre-stored thresholds) in the memory 17. The memory 17 includes a volatile memory and/or a non-volatile memory.

In one aspect, the light source 11, the image sensor 13, the processor 15 and the memory 17 together encapsulated in a sensing chip for detecting the cliff and outputting a flag signal Sc (e.g., a digital value for indicating a cliff or no cliff) to the MCU 20. The MCU 20 is used to control operations of the mobile robot 100, e.g., including moving at a preset speed (e.g., controlling a rotation speed of wheels 19), turning a moving direction Dm (e.g., corresponding to the flag signal Sc from the processor 15), and/or giving an alarm (e.g., corresponding to the flag signal Sc from the processor 15), but not limited to.

The light source 11 is, for example, a light emitting diode, that illuminates the operation surface S using light of a predetermined (e.g., infrared) spectrum.

The image sensor 13 includes, e.g., a CMOS image sensor or a CCD image sensor that receives reflected light of the predetermined spectrum from the operation surface S and generates image frames. The image sensor 13 captures the image frames using auto exposure.

In one aspect, the light source 11 and the image sensor 13 are arranged at a bottom surface of the mobile robot 100 and close to a side of a moving direction Dm, e.g., shown at a side toward the stair having a height H in FIG. 1. Preferably, the light source 11 and the image sensor 13 are closer to the side of the moving direction Dm than wheels 19 of the mobile robot 100 such that a cliff is detected before the wheels 19 reach the cliff.

In one aspect, a field of view of the image sensor 13 is perpendicular to a bottom surface (or the operation surface S) of the mobile robot 100, but not limited to. In other aspects, a field view of the image sensor 13 it tilted (e.g., smaller than 5 degrees) toward the moving direction Dm of the mobile robot 100 to capture image frames as long as the field of view covers an illuminated region of the light source 11 so as to detect a cliff before the wheels 19 reach the cliff.

The processor 15 is, for example, a digital signal processor (DSP), an application specific integrated circuit (ASIC) or a field programmable gate array (FPGA) that implements functions thereof, e.g., including processing image frames and identifying a cliff, using hardware and/or firmware.

The processor 15 calculates a moving speed of the mobile robot 100 according to the image frames captured by the image sensor 13, e.g., calculating the moving speed using correlation between successive image frames, which are known to the art and thus details thereof are not described herein.

In one aspect, when the processor 15 identifies that, according to the image frames captured by the image sensor 13, the moving speed is smaller than the preset speed exceeding a variation threshold, a cliff detection mode is triggered or activated. The conditions that cause the moving speed to drop significantly include a front end of the mobile robot 100 reaching a cliff (causing a field of view of the image sensor 133 exceeding the operation surface S), the wheels 19 or wheel shaft being twisted by foreign objects (e.g., hairs) or the main body slips. The mobile robot 100 of the present disclosure distinguishes whether a cliff is reached and performs corresponding controls.

In the cliff detection mode, the processor 15 identifies a cliff according to image frames respectively captured when the light source 11 is turned on and turned off. In one aspect, the mobile robot 100 stops moving or slows down in the cliff detection mode.

Figure 3:
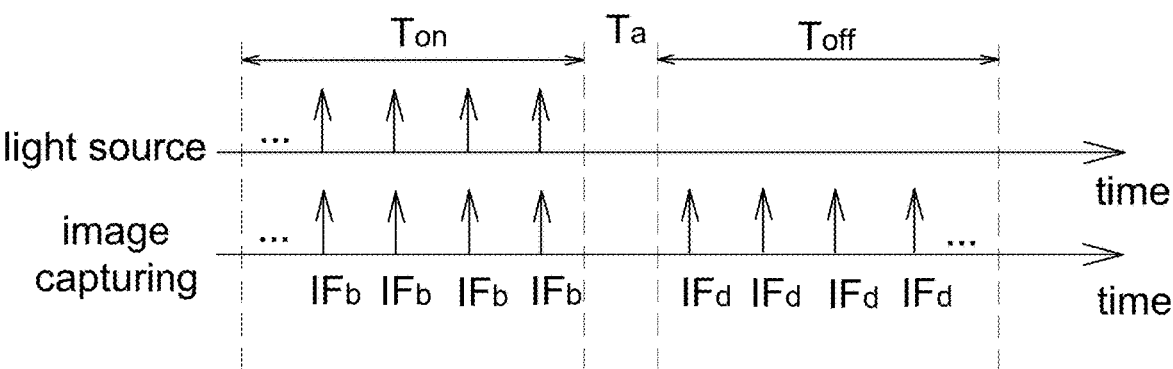
FIG. 3 is an operational timing diagram of a light source and an image sensor of a mobile robot according to one embodiment of the present disclosure.

Please refer to FIG. 3, it is an operational timing diagram of a light source 11 and an image sensor 13 of a mobile robot 100 according to one embodiment of the present disclosure. The light source 11 lights up multiple times within a first interval Ton and continuously lights off within a second interval Toff. In one aspect, the first interval Ton is equal to the second interval Toff, e.g., 50 ms to 100 ms, but not limited to. In another aspect, the first interval Ton is different from the second interval Toff, e.g., Toff>Ton or Ton>Toff.

The image sensor 13 captures multiple bright image frames IFb within the first interval Ton using a first shutter, and captures multiple dark image frames IFd within the second interval Toff using a second shutter, wherein the first shutter and the second shutter determines the exposure of the image sensor 13 and are determined by the auto exposure. Details of the auto exposure are known to the art, and thus are not described herein. In one aspect, the image sensor 13 acquires an identical number of image frames within the first interval Ton and the second interval Toff. In another aspect, the image sensor 13 acquires different numbers of image frames respectively within the first interval Ton and the second interval Toff. The pre-stored thresholds are adapted to the lengths of the first interval Ton and the second interval Toff as well as a number of image frames being captured therein.

In one aspect, an adapt interval Ta is arranged, for the image sensor 13 to adapt to environment without light, between the first interval Ton and the second interval Toff. The adapt interval Ta is shorter than the first interval Ton and the second interval Toff, e.g., selected as 25 ms to 50 ms, but not limited to. In one aspect, the light source 11 is turned off and the image sensor 13 does not capture any image frame within the adapt interval Ta. In another aspect, the light source 11 is turned off but the image sensor 13 still captures image frames within the adapt interval Ta, but the processor 15 does not process the image frames captured by the image sensor 13 in the adapt interval Ta.

The processor 15 performs cliff identification according to a difference value between averages of gray level summation of multiple bright image frames IFb and the multiple dark image frames IFd, a difference value between averages of image quality of multiple bright image frames IFb and multiple dark image frames IFd, and an average shutter difference.

More specifically, the processor 15 calculates an average of first gray level summation of multiple bright image frames IFb (i.e. summing pixel values of every bright image frame IFb and then calculating an average of multiple summations) and an average of first image quality of multiple bright image frames IFb (i.e. summing image quality of multiple bright image frames IFb and then calculating an average of the summation), wherein the image quality may use the known image quality without particular limitations as long as the image quality is able to indicate the feature of one image frame.

The processor 15 further calculates an average of second gray level summation of multiple dark image frames IFd and an average of second image quality of multiple dark image frames IFd, which are respectively calculated using the same way as calculating the average of first gray level summation and the average of first image quality and thus details thereof are not repeated herein.

The processor 15 further calculates a gray level difference between the average of first gray level summation and the average of second gray level summation, an image quality difference between the average of first image quality and the average of second image quality, as well as an average shutter difference between the first shutter and the second shutter.

It is appreciated that in the first interval Ton first shutters for capturing every bright image frame IFb is identical to or different from each other. Similarly, in the second interval Toff second shutters for capturing every dark image frame IFd is identical to or different from each other. Accordingly, the processor 15 firstly averages multiple first shutters (all identical or partially identical) used within the first interval Ton and averages multiple second shutters (all identical or partially identical) used within the second interval Toff, and then calculates a difference value between the averaged first shutter and the averaged second shutter as an average shutter difference.

In the present disclosure, the processor 15 performs the cliff identification using at least one of the gray level difference, the image quality difference and the average shutter difference, which are used as pixel statistics herein. It is noticed that when a front end (i.e. a side arranging the light source 11 and the image sensor 13) of the mobile robot 100 reaches a cliff, a difference of pixel statistics between bright image frames and the dart image frames becomes small.

For example, the memory 17 pre-stores a gray level threshold, an image quality threshold and a shutter threshold for the processor 15 to be respectively compared with the difference value between averages of gray level summation (i.e. the gray value difference), the difference value between averages of image quality (i.e. the image quality difference) and the average shutter difference.

When identifying that the difference value between averages of gray level summation is smaller than the gray level threshold, the difference value between averages of image quality is smaller than the image quality threshold, and the average shutter difference is smaller than the shutter threshold, the processor 15 identifies a cliff in front. In this aspect, the processor 15 further controls the mobile robot 100 to turn, e.g., moving in an opposite direction or turning by 90 degrees, but not limited to, when identifying a cliff in front.

For example, when identifying a cliff in front, the sensing chip generates a flag signal Sc to the MCU 20 to perform the turning control.

However, when identifying that at least one of (1) the difference value between averages of gray level summation is smaller than the gray level threshold, (2) the difference value between averages of image quality is smaller than the image quality threshold, and (3) the average shutter difference is smaller than the shutter threshold, is not true, the processor 15 identifies no cliff in front. As mentioned above, in the scenario that the detected speed has a sudden drop but no cliff is detected in front by the sensing chip, it means that the mobile robot 100 is twisted by something or having a slip, and then the sensing chip controls the mobile robot 100 to give an error alarm. For example, when the processor 15 identifies no cliff in front, the sensing chip generates a flag signal Sc to the MCU 20 to give the warning, e.g., generating a warning sound, sending a message to a cellphone, but not limited to.

In one aspect, the cliff detection function is deactivated when the moving speed is substantially identical (e.g., a difference therebetween being smaller than a predetermined value) to the preset speed.

Figure 4:
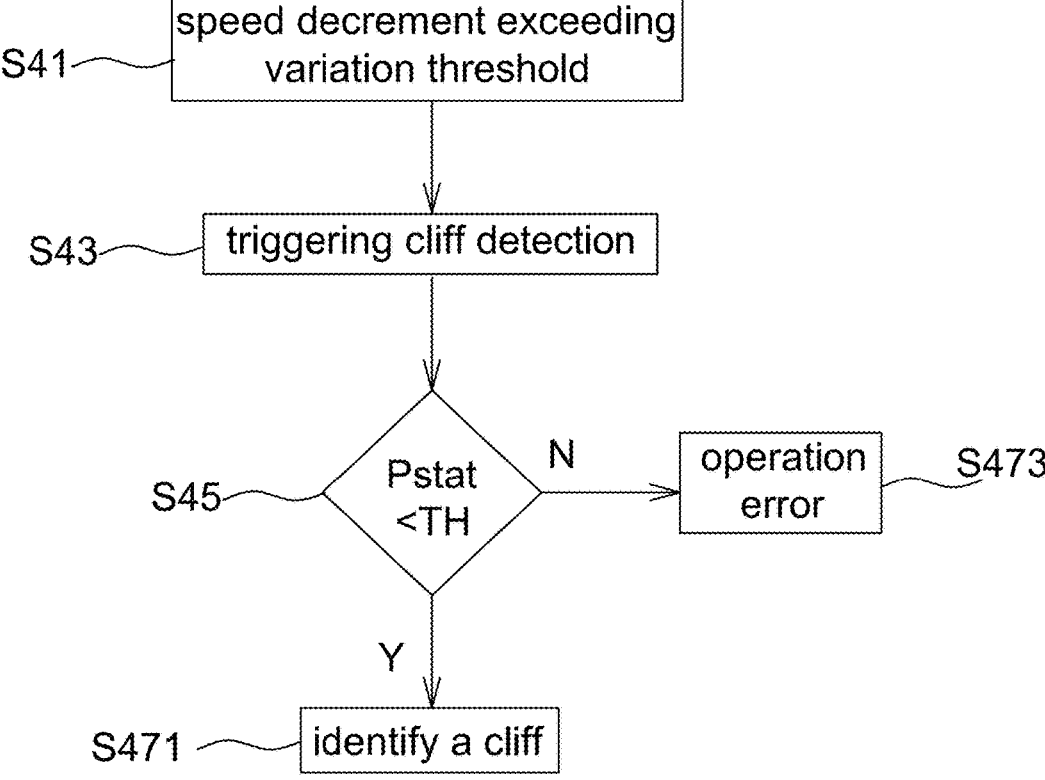
FIG. 4 is a flow chart of a cliff detection method of a mobile robot according to one embodiment of the present disclosure.

Please refer to FIG. 4, it is a flow chart of a cliff detection method of a mobile robot 100 according to one embodiment of the present disclosure, including the steps of: after a decrement of speed exceeds a variation threshold (Step S41), triggering cliff detection (Step S43); comparing pixel statistics Pstat with pre-stored thresholds TH (Step S45); identifying a cliff when the pixel statistics are lower than the pre-stored thresholds (Step S471); and identifying an operation error when the pixel statistics are not lower than the pre-stored thresholds (Step S473).

Step S41: In operation, the mobile robot 100 moves forward at a preset speed. Meanwhile, a sensing chip (e.g., including the light source 11, the image sensor 13 and a processor 15) arranged on the mobile robot 100 calculates a moving speed of the mobile robot 100 with respect to an operation surface S. For example, the image sensor 13 captures image frames at a predetermined frequency, and the processor 15 calculates the moving speed with respect to the operation surface S by comparing successive image frames (e.g., calculating correlation). In the scenario that the operation surface S does not have an obstacle in front and the mobile robot 100 operates normally, the moving speed obtained by the processor 15 is substantially identical to the preset speed. When the moving speed obtained by the processor 15 drops significantly to be lower than the preset speed exceeding a variation threshold (or the decrement more than a variation threshold), it means that the mobile robot 100 encounters some conditions and thus the mobile robot 100 enters the Step S43.

Step S43: Please refer to FIG. 3 again, after the cliff detection is activated, the processor 15 controls the light source 11 to emit light at a predetermined frequency (identical to or different from the frequency before the cliff detection is activated) within a first interval Ton and to turn off within a second interval Toff. As mentioned above, it is possible to arrange an adapt interval Ta between the first interval Ton and the second interval Toff.

In one aspect, the first interval Ton is a period of time before entering the cliff detection. That is, the processor 15 periodically calculates and stores (e.g., in the memory 17) pixel statistics of bright image frames (e.g., also for calculating moving speed) before entering the cliff detection.

After entering the cliff detection, only the second interval Toff is required. In this way, the response time of the cliff detection is shortened.

Step S45: In the cliff detection, the sensing chip compares pixel statistics of multiple bright image frames IFb and multiple dark image frames IFd captured thereby with pre-stored thresholds to identify a cliff in front.

As mentioned above, the pixel statistics include a gray level difference between an average of first gray level summation of the multiple bright image frames IFb and an average of second gray level summation of the multiple dark image frames IFd; an image quality difference between an average of first image quality of the multiple bright image frames IFb and an average of second image quality of the multiple dark image frames IFd; and an average shutter difference between a first shutter for capturing the multiple bright image frames IFb and a second shutter for capturing the multiple dark image frames IFd.

In the present disclosure, lengths of the first interval Ton and the second interval Toff as well as a number of bright image frames IFb and the dark image frames IFd are set according to the component parameter and operational environment. The pre-stored thresholds include a gray level threshold, an image quality threshold and a shutter threshold, which are pre-stored in the memory 17 to be accessed by the processor 15.

Step S471: When identifying that (1) the difference value between averages of gray level summation is smaller than the gray level threshold, (2) the difference value between averages of image quality is smaller than the image quality threshold, and (3) the average shutter difference is smaller than the shutter threshold, the processor 15 identifies a cliff in front. In this case, the sensing chip controls the mobile robot 100 to turn a moving direction Dm, e.g., the processor 15 sending a flag signal Sc to the MCU 20 to perform the corresponding control. The method of controlling the mobile robot 100 to turn a moving direction thereof by the MCU 20 is known to the art and not a main objective of the present disclosure, and thus details thereof are not described herein.

Step S473: When identifying that at least one of the above three conditions (1) to (3) is not true, the processor 15 identifies no cliff in front. In this case, the sensing chip controls (e.g., the processor 15 sending a flag signal Sc to the MCU 20) the mobile robot 100 to generate an error alarm, which is not particularly limited as long as the user is informed to check the operating condition of the mobile robot 100.

In one aspect, when the detected speed has significant drop but no cliff is detected in front, the sensing chip informs the MCU 20 (with or without error alarm) to turn off the operation of the mobile robot 100.

It should be mentioned that although FIG. 1 shows that the mobile robot 100 is a cleaning robot, the present disclosure is not limited thereto. The mobile robot 100 of the present disclosure is any mobile robot that performs the transportation, introduction, guiding or other preset missions.

The sensing chip of the mobile robot 100 of the present disclosure is arranged on an open structure or a closed structure. In said closed structure, the mobile robot 100 has a light blocking cover arranged at a side of a moving direction of the mobile robot 100 such that the image sensor 13 is blocked not to receive ambient light from the moving direction. In said open structure, the mobile robot 100 does not have a light blocking structure to prevent the image sensor 13 from receiving ambient light. In one aspect, it is possible to arrange the pre-stored thresholds corresponding to both the open structure and the closed structure by testing the pre-stored thresholds at different ambient light conditions. In another aspect, the pre-stored thresholds are adjustable by the user or maker corresponding to different structure types or corresponding to different ambient light intensity (e.g., daytime or at night, indoor or outdoor).

As mentioned above, the conventional cleaning robot detects a cliff using a mechanical sensor or an ultrasonic sensor. The present disclosure further provides a mobile robot adopting an optical cliff detection method (e.g., FIG. 1) that compares the variation degree of pixel statistics caused by turning on and turning off a light source to accordingly identify whether the mobile robot actually encounters a cliff and perform corresponding controls.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mobile robot, comprising:
a light source, configured to be turned on within a first interval and be turned off within a second interval;
an image sensor, configured to capture multiple bright image frames within the first interval using a first shutter, and capture multiple dark image frames within the second interval using a second shutter, wherein, within the second interval, the light source is not turned on between capturing adjacent two dark image frames among the multiple dark image frames; and
a processor, configured to
calculate an average of first gray level summation of the multiple bright image frames,
calculate an average of second gray level summation of the multiple dark image frames,
calculate a gray level difference between the average of first gray level summation and the average of second gray level summation, and
perform cliff identification according to the gray level difference.

2. The mobile robot as claimed in claim 1, wherein the light source and the image sensor are arranged at a bottom surface of the mobile robot and close to a side of a moving direction of the mobile robot.

3. The mobile robot as claimed in claim 2, further comprising a light blocking cover arranged at the side of the moving direction of the mobile robot to block the image sensor from receiving ambient light from the moving direction.

4. The mobile robot as claimed in claim 1, further comprising a memory configured to store gray level threshold to be compared with the gray level difference.

5. The mobile robot as claimed in claim 1, wherein a field of view of the image sensor is perpendicular to a bottom surface of the mobile robot.

6. The mobile robot as claimed in claim 1, wherein the cliff identification is triggered when a moving speed of the moving robot is lower than a preset speed by a variation threshold.

7. The mobile robot as claimed in claim 1, wherein
the light source is turned off within an adapt interval between the first interval and the second interval,
the first interval is equal to the second interval, and
the first interval and the second interval are longer than the adapt interval.

8. A mobile robot, comprising:

a light source, configured to be turned on within a first interval and be turned off within a second interval;

an image sensor, configured to capture multiple bright image frames within the first interval using a first shutter, and capture multiple dark image frames within the second interval using a second shutter, wherein, within the second interval, the light source is not turned on between capturing adjacent two dark image frames among the multiple dark image frames; and a processor, configured to calculate an average of first image quality of the multiple bright image frames, calculate an average of second image quality of the multiple dark image frames, calculate an image quality difference between the average of first image quality and the average of second image quality, and perform cliff identification according to the image quality difference.

9. The mobile robot as claimed in claim 8, wherein the light source and the image sensor are arranged at a bottom surface of the mobile robot and close to a side of a moving direction of the mobile robot.

10. The mobile robot as claimed in claim 9, further comprising a light blocking cover arranged at the side of the moving direction of the mobile robot to block the image sensor from receiving ambient light from the moving direction.

11. The mobile robot as claimed in claim 8, further comprising a memory configured to store image quality threshold to be compared with the image quality difference.

12. The mobile robot as claimed in claim 8, wherein a field of view of the image sensor is perpendicular to a bottom surface of the mobile robot.

13. The mobile robot as claimed in claim 8, wherein the cliff identification is triggered when a moving speed of the moving robot is lower than a preset speed by a variation threshold.

14. The mobile robot as claimed in claim 8, wherein the light source is turned off within an adapt interval between the first interval and the second interval, the first interval is equal to the second interval, and the first interval and the second interval are longer than the adapt interval.

15. A mobile robot, comprising:

a light source, configured to be turned on within a first interval and be turned off within a second interval;

an image sensor, configured to capture multiple bright image frames within the first interval using a first shutter, and capture multiple dark image frames within the second interval using a second shutter, wherein, within the second interval, the light source is not turned on between capturing adjacent two dark image frames among the multiple dark image frames; and a processor, configured to calculate an average of multiple first shutters within the first interval and an average of multiple second shutters within the second interval, calculate an average shutter difference between the average of multiple first shutters and the average of multiple second shutters, and perform cliff identification according to the average shutter difference.

16. The mobile robot as claimed in claim 15, wherein the light source and the image sensor are arranged at a bottom surface of the mobile robot and close to a side of a moving direction of the mobile robot.

17. The mobile robot as claimed in claim 16, further comprising a light blocking cover arranged at the side of the moving direction of the mobile robot to block the image sensor from receiving ambient light from the moving direction.

18. The mobile robot as claimed in claim 15, further comprising a memory configured to store a shutter threshold to be compared with the average shutter difference.

19. The mobile robot as claimed in claim 15, wherein a field of view of the image sensor is perpendicular to a bottom surface of the mobile robot.

20. The mobile robot as claimed in claim 15, wherein the cliff identification is triggered when a moving speed of the moving robot is lower than a preset speed by a variation threshold.

\* \* \* \* \*